US008110235B2

(12) United States Patent
Salinas et al.

(10) Patent No.: US 8,110,235 B2
(45) Date of Patent: Feb. 7, 2012

(54) METHODS FOR REDUCING CHOLESTEROL IN A MILK PRODUCT

(75) Inventors: I. Edward Salinas, Racine, WI (US); Eduardo Segovia Cantu, Saltillo (MX); Jacquelyn S. Brandenburg, Kenosha, WI (US)

(73) Assignee: Alliance Enterprises of S.E. Wisconsin, LLC, Racine, WI (US)

( * ) Notice: Subject to any disclaimer, the term of this patent is extended or adjusted under 35 U.S.C. 154(b) by 937 days.

(21) Appl. No.: 12/151,392

(22) Filed: May 6, 2008

(65) Prior Publication Data

US 2009/0280233 A1 Nov. 12, 2009

(51) Int. Cl.
A23C 1/00 (2006.01)

(52) U.S. Cl. ......... 426/491; 426/580; 426/585; 426/601

(58) Field of Classification Search .................. 426/490, 426/491, 580, 585, 586, 601, 602, 613
See application file for complete search history.

(56) References Cited

U.S. PATENT DOCUMENTS

| | | | |
|---|---|---|---|
| 3,717,474 A | 2/1973 | Fioriti et al. | |
| 4,333,959 A | 6/1982 | Bracco et al. | |
| 4,997,668 A | 3/1991 | Johnson et al. | |
| 5,175,015 A | 12/1992 | Kahn et al. | |
| 5,200,226 A | 4/1993 | Sanchez | |
| 5,326,579 A | 7/1994 | Richardson et al. | |
| 5,370,890 A | 12/1994 | Sundfeld et al. | |
| 5,378,487 A | 1/1995 | Merchant et al. | |
| 5,412,127 A | 5/1995 | Mentink et al. | |
| 5,490,999 A | 2/1996 | Villagran et al. | |
| 5,928,702 A | 7/1999 | Lidman et al. | |
| 5,935,632 A | 8/1999 | Larsen | |
| 6,110,517 A | 8/2000 | Kwak et al. | |
| 7,258,886 B2 | 8/2007 | Brue et al. | |
| 2002/0034562 A1 | 3/2002 | Sundram et al. | |
| 2002/0119238 A1 | 8/2002 | Pires | |
| 2006/0019008 A1 | 1/2006 | Hruschka et al. | |

FOREIGN PATENT DOCUMENTS

| | | |
|---|---|---|
| EP | 0 615 690 | 9/1994 |
| GB | 2 238 456 | 6/1991 |
| KR | 2003 0064716 | 8/2003 |
| WO | WO 92/05710 | 4/1992 |

OTHER PUBLICATIONS

Shim et al., Functional Properties of Cholesterol-Removed Whipping Cream Treated by B-Cyclodextrin, 86 J. Dairy Sci., pp. 2767-2772, 2003.
Jensen, Robert G., Invited Review: The Comosition of Bovine Milk Lipids: Jan. 1995 to Dec. 2000, 85 J. Dairy Sci., pp. 295-350, 2001.
Lee et al., Cholesterol Removal from Homogenized Milk with B-Cyclodextrin, 82 J. Dairy Sci., pp. 2327-2330, 1999.
Bradley, R.L., Jr., Removal of Cholesterol from Milk Fat using Supercritical Carbon Dioxide, 72 J.Dairy Sci., pp. 2834-2840, 1989.
Boudreau et al., Cholesterol Reduction and Fat Fractionation Technologies for Milk Fat: An Overview, 76 J. Dairy Sci., pp. 1772-1781, 1993.
Lee, et al., "Cholesterol Removal from Homogenized Milk with β-Cyclodextrin," Journal of Dairy Science, vol. 82, No. 11, pp. 2327-2330 (1999).
Food Industries Manual, M.D. Ranken, 24th Ed., p. 89, Leatherhead Food Research Association (1997).
International Preliminary Report on Patentability for Intl. Pat. Appln. No. PCT/US2009/043621, mailed on Nov. 25, 2010, 5 pp.
International Search Report and Written Opinion for Intl. Pat. Appln. No. PCT/US2009/043621, mailed on Dec. 30, 2009, 6 pp.
International Preliminary Report on Patentability for Intl. Pat. Appln. No. PCT/US2009/002779, dated Aug. 6, 2010, 9 pp.
International Search Report and Written Opinion for Intl. Pat. Appln. No. PCT/US2009/002779, mailed on Jun. 12, 2009, 8 pp.
Kim, et al., "Crosslinking of β-Cyclodextrin on Cholesterol Removal from Milk," Archives of Pharmacal Research, vol. 27, No. 11, pp. 1183-1187 (2004).
Non-Final Office Action for U.S. Appl. No. 12/145,925, mailed on Mar. 7, 2011, 16 pp.
EP Communication issued in European Patent Application No. 09743030.0 and dated Sep. 15, 2011.
Notice of Allowance issued in U.S. Appl. No. 12/145,925 and mailed Aug. 23, 2011.
Database FSTA [Online] International Food Information Service (IFIS), "Cholesterol free dairy products" Khranitelna Promishlenost, vol. 43, No. 3, Jan. 1, 1994, pp. 10. (English translation only).
European Search Report received for European Appln. No. 09743030.0 dated Nov. 22, 2011.
Julien, J., "Dairy Science and Technology," Presses Universite Laval, Jan. 1, 1985, pp. 167-171.
De Villiers, K., "Less cholesterol—naturally," Milk & Juice, Mar. 1, 2009, pp. 23-25.
Kessler, H.G., "Lebensmittel- und Bioverfahrenstechnik; Molkerietechnologie," 3 Zentrifugieren—Separieren—Zyklonabscheidung, Jan. 1, 1996, pp. 49-50. (No English translation available).
Merrett, N., Retrieved from: cholesterol-cuffing. "process development tergets dairy cholesterol cutting," May 23, 2008, 1 page, URL: http://www.dairyreporter.corn/Formulation/Process-development-targets-dairy-cholesterol-cutting.

*Primary Examiner* — Leslie Wong
(74) *Attorney, Agent, or Firm* — Foley & Lardner LLP

(57) ABSTRACT

Systems and methods according to the present invention yield milk products having reduced cholesterol. A method according to the present invention includes the steps of adding an edible oil to skim that was separated from whole milk; standardizing the particle size of the skim-and-oil mixture; combining the skim-and-oil mixture with homogenized cream that was separated from whole milk; and separating the oil from the reduced cholesterol cream and skim. A method according to the present invention may further include the steps of separating the reduced cholesterol cream and skim and then recombining them to form a reduced cholesterol milk product having desired properties.

25 Claims, 3 Drawing Sheets

METHODS FOR REDUCING CHOLESTEROL IN A MILK PRODUCT

BACKGROUND OF THE INVENTION

The present invention relates generally to systems and methods utilized in fluid processing operations and more specifically to systems and methods for reducing cholesterol in a milk product, where the milk product may have a selective fat content.

Physicians and health experts generally agree that a diet low in saturated fats and cholesterol can reduce the likelihood of heart and circulatory diseases. Consumer awareness of the health benefits associated with maintaining a diet low in fat and cholesterol has recently increased, along with the demand for food products low in these components. Because of its low fat content, skim milk currently has large applications in such low fat food products.

Whole milk is a dilute emulsion combined with a colloidal dispersion in which the continuous phase is a solution. Whole milk has a fat content typically between about 3.3% to about 3.4% and 14 mg cholesterol per 100 g milk. To obtain skim milk, whole milk is usually centrifuged. An oil rich phase having cream floating on top and a liquid phase, or skim milk, are obtained.

In milk products, the majority of the fat and about 80 percent to about 85 percent of the total cholesterol is present in the cream. The cream is comprised of predominantly milk fat globules. The cholesterol in the milk fat is thought to be distributed between the milk fat globule membrane and the bulk lipid. Wong, Fundamentals of Dairy Chemistry (1988). It was once thought that when the membrane was separated from the milk fat globules and the butter oil was isolated from the milk fat globules, that about 90 percent or greater of the cholesterol was equilibrated in the butter oil and about 5 percent or greater was in the membrane. Contrary to this prior interpretation, there may actually be very little connection between cholesterol content and fat content.

Roughly, prior skim milk contains about 10% to about 20% of the cholesterol that is in whole milk. Skim milk contains less than about 0.5% fat, about 10% solids and typically about 2 to about 3 mg of cholesterol per 100 g of skim milk.

The cholesterol in milk products is thought to be associated with triglycerides, milk fat globules and complex proteins. Cholesterol in skim milk is thought to exist in three forms: (i) complexed with residual triglyceride droplets not removed in the skimming process, (ii) complexed with lipoprotein particles sloughed off from milk fat globule membranes in the skimming process, and (iii) complexed with proteins contained in the serum albumin. When skim milk, reduced-fat or whole milk is concentrated, its cholesterol content increases proportionally. For example, nonfat dry milk has a cholesterol content of about 20-30 mg per 100 grams. Therefore, the use of skim milk, reduced-fat or whole milk as an ingredient in low fat foods can contribute significant amounts of cholesterol to these foods.

It is therefore desirable to produce milk products that have a substantially reduced cholesterol content. A satisfactory cholesterol removal process would maximize cholesterol removal without affecting the protein functionality or other properties of the milk. A desirable removal process would be simple to perform and would minimize equipment and raw material requirements. Furthermore, the use of potentially harmful materials such as organic polar solvents would preferably be avoided. No such method is known to have been developed prior to the present invention.

Several approaches have been utilized for removing the cholesterol from milk fats. For instance, methods of removing cholesterol from fats by contacting with adsorbent materials such as silica gel and activated carbon. When applied to milk products, such adsorbents have been found to either be too impractical for commercial use or to lack specificity for cholesterol adsorption. Also, supercritical extraction processes have been used; however, such processes involve extreme process conditions and are generally too expensive for large commercial applications.

Therefore, the art of reducing cholesterol in milk products would benefit from systems and methods utilizing an edible oil for reducing cholesterol in a resulting milk product having desired fat content.

SUMMARY OF THE INVENTION

The present invention provides systems and methods utilizing an edible oil for reducing cholesterol in a resulting milk product having desired fat content.

In a first embodiment, a method according to the present invention includes the step of providing skim and cream, both of which may have been separated from provided whole milk. The skim is combined with edible oil, such as soybean oil, at a predetermined oil-to-skim ratio, such as one part oil to nineteen parts skim, to make a skim-and-oil mixture. The skim may be heated prior to being combined with the oil. The skim-and-oil mixture is blended, thereby forming a blended skim-and-oil mixture. The particle size of the blended skim-and-oil mixture is then standardized, thereby forming a particulated skim-and-oil mixture. The standardization of the skim-and-oil mixture may be performed by shearing the blended skim-and-oil mixture, such as by a shear pump or colloid mill. The desired particle size of the particulated skim-and-oil mixture is preferably in the range of about 0.1 microns to about 10 microns.

The provided cream is homogenized, thereby making a homogenized cream. The cream may be heated prior to homogenization. The homogenized cream preferably has a particle size of about 0.04 microns to about 1 micron, and more preferably has a particle size of about 0.08 microns to about 0.5 microns. A predetermined amount of the homogenized cream is combined with the particulated skim-and-oil mixture, thereby making a milk-and-oil mixture. The milk-and-oil mixture is held for a predetermined period of time at a predetermined temperature and is preferably agitated during the hold time. A majority of the edible oil is then separated from the milk-and-oil mixture, thereby leaving a first reduced cholesterol milk product.

In another embodiment, a method according to the present invention further comprises the step of separating the first reduced cholesterol milk product into a first reduced cholesterol skim and a first reduced cholesterol cream, either or both of which may be further separated to remove substantially all remaining oil, thereby leaving a second reduced cholesterol skim and/or a second reduced cholesterol cream, respectively. Another embodiment may include the step of combining the first or second reduced cholesterol skim with the first or second reduced cholesterol cream at a predetermined skim-cream ratio, thereby making a second reduced cholesterol milk product.

In yet another embodiment of a method according to the invention, any method according to the present invention is performed substantially automatically by a system after initial programming by an operator.

Another method according to the present invention includes the steps of providing an initial milk product—such as skim milk, 1% milk, 2% milk or whole milk—and combining the initial milk product with an edible oil at a predetermined oil-to-milk ratio thereby making a milk-and-oil mixture. The milk-and-oil mixture is blended, thereby forming a blended milk-and-oil mixture. The particle size of the blended milk-and-oil mixture is then standardized, thereby forming a particulated milk-and-oil mixture, which is held and agitated at a predetermined hold temperature for a predetermined period of time, thereby forming a modified milk mixture. A majority of the edible oil is then separated from the modified milk-and-oil mixture, thereby leaving a first reduced cholesterol milk product.

The method may further include the steps of providing cream and homogenizing the cream, thereby making a homogenized cream. A predetermined amount of the homogenized cream may be combined with the blended milk-and-oil mixture prior to standardizing the blended milk-and-oil mixture, thereby incorporating the predetermined amount of homogenized cream into the particulated milk-and-oil mixture. Alternatively, or additionally, a predetermined amount of the homogenized cream may be combined with the particulated milk-and-oil mixture prior to the holding and agitating steps, thereby incorporating the predetermined amount of homogenized cream into the modified milk-and-oil mixture. The method may further comprise the steps of separating whole milk to obtain the initial milk product and the cream.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
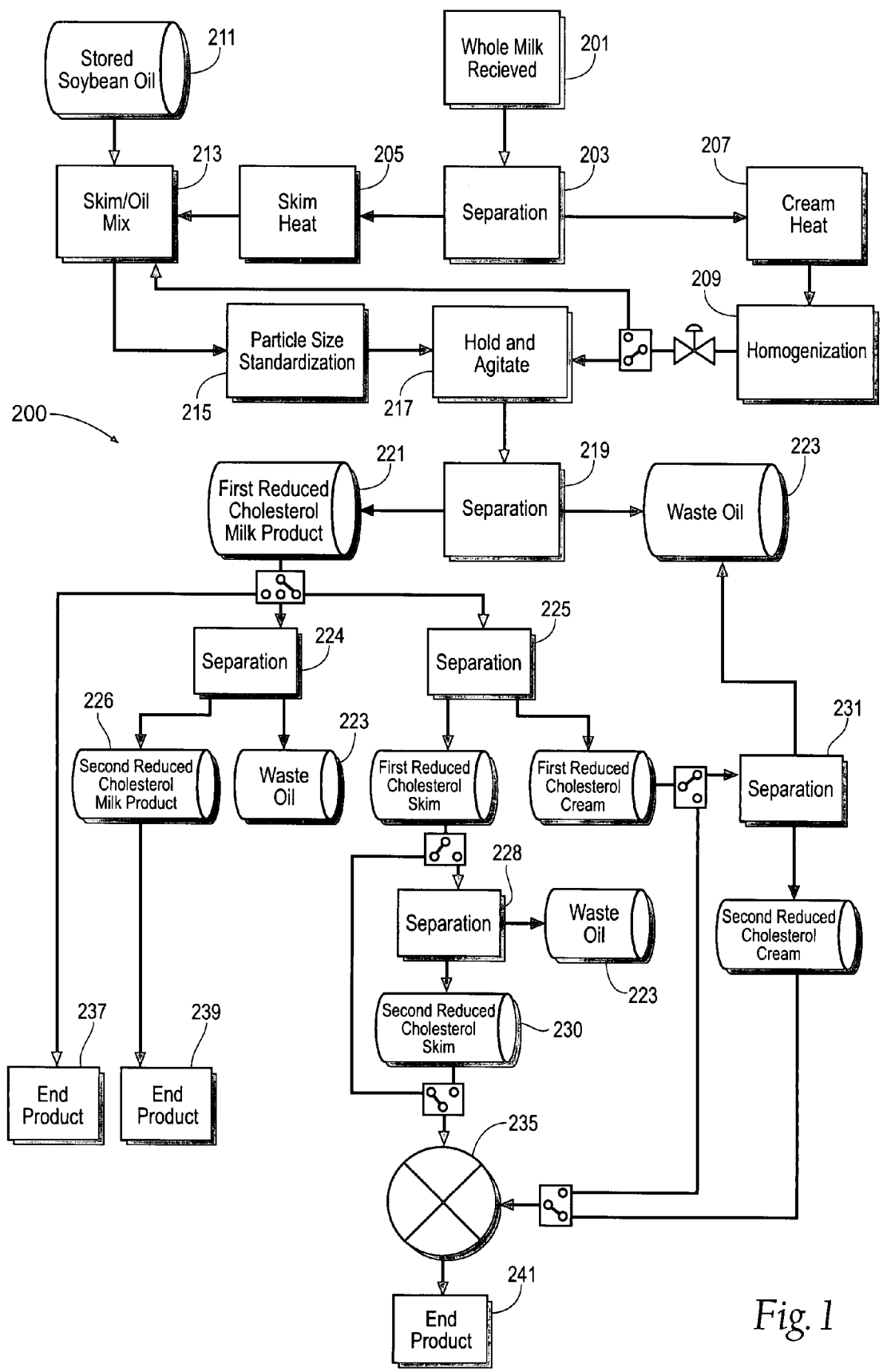
FIG. 1 is a first embodiment of a method for reducing cholesterol in a milk product.
Figure 2A:
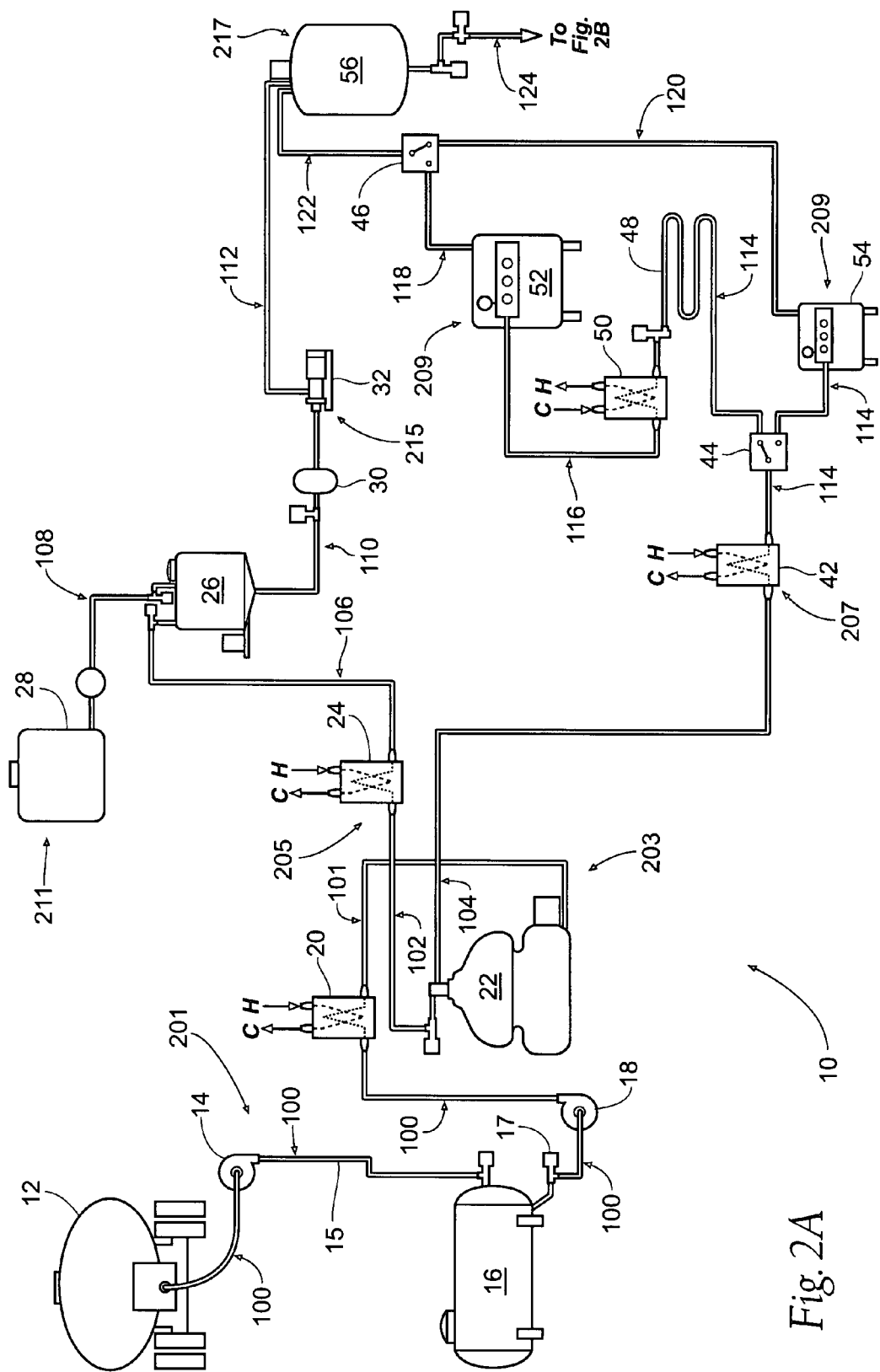
FIGS. 2A and 2B provide a first embodiment of a system for reducing cholesterol in a milk product.
Figure 2B:
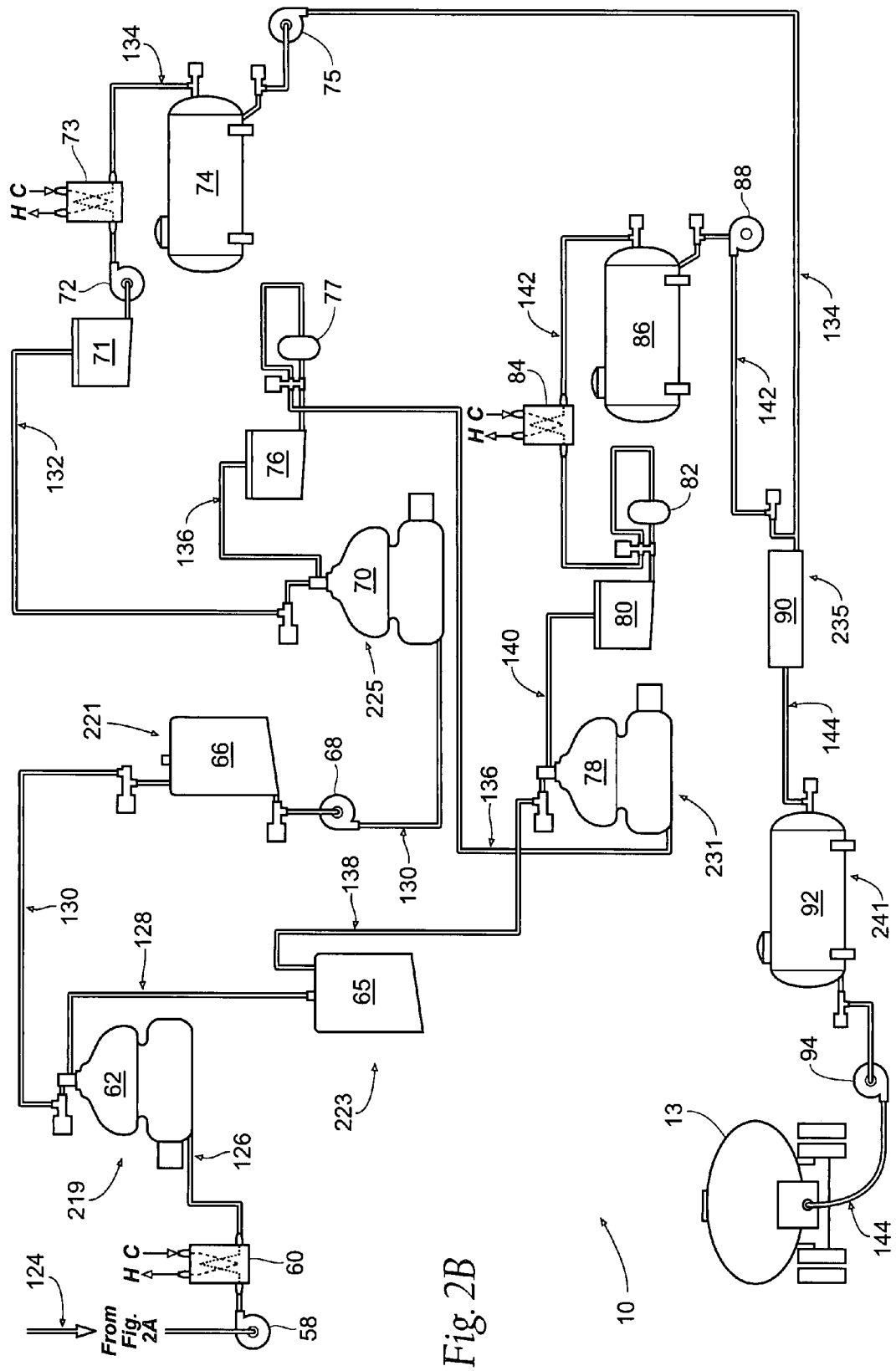

Turning now to the figures, FIG. 1 presents an embodiment 200 of a method of reducing cholesterol in a milk product according to the present invention. The method 200 will be explained with reference also to the system 10 depicted in FIG. 2A and FIG. 2B. The system 10 is preferably generally controlled by a programmable logic controller (PLC) that is programmable or otherwise interactive through a human machine interface (HMI), which may be provided on a touchscreen panel. Before initiating the processing of a quantity of raw whole milk 100 that has been received 211, the PLC may require some programming input from a system operator. For instance, the operator may program the PLC with the whole milk batch size to be processed. Other parameters will be discussed throughout the remaining description.

Depending on the implementation of the system 10, some manual swing connections may be required to establish desired or required fluid flow paths. For instance, flowverter panels may be used to direct fluid flow. Flowverter panels may be used, for example, to insert or remove optional equipment from the fluid flow circuit. Once the manual swing connections have been made, if needed, the generally automated process may begin.

The method 200 generally begins when after whole milk 100, which may be raw, is received 201. The raw whole milk 100 is delivered to a processing site having a receiving capacity, which may be, for example, 3000 gallons. The delivery 201 may be made to a processing site by way of a delivery vessel 12, such as a tank carried by a truck. The delivery vessel 12 is preferably coupled to a receiving pump 14, which conveys the raw whole milk 100 from the delivery vessel 12 to a receiving tank 16. A flowmeter (not shown) may be installed in the flow path from the delivery vessel 12 to the receiving tank 16 to monitor the amount of product pumped into the tank 16 to assist in preventing overflow. A level transmitter (not shown) may be operatively coupled to the receiving tank 16 to provide an overflow or desired level emergency alert, also to assist in preventing an overflow condition. Upon completion of receiving 201 the raw whole milk 100, the receiving line 15 may be air blown by way of an air blow check valve and an air solenoid valve, which reside generally at opposite ends of the receiving line 15. Alternatively, rather than receiving raw whole milk 100, the process may begin by receiving raw skim and raw cream which have been separated from raw whole milk. Generally, the whole milk 100, or other supplied cream and skim, is received into the receiving tank 16, which may keep the delivered product at a desired temperature, such as approximately forty degrees Fahrenheit.

After the delivery 201 of raw whole milk 100, the method 200 generally includes a whole milk separation step 203, using a separator 22 to separate the raw whole milk 100 into skim 102 and cream 104. While the process herein describes use of skim 102 and cream 104, it is to be understood that the skim 102 is provided as an initial milk product, but other initial milk products are contemplated. Thus, the process may be run on an initial milk product that is, for example, one or two percent milk, or whole milk. The whole milk 100 is preferably heated prior to separation 203, perhaps by flowing through a whole milk heat exchanger 20, thereby creating a heated whole milk 101. The whole milk 100 may be heated to any desirable temperature that will maintain integrity of the milk 100, but a temperature of about ninety-five degrees to about one hundred and ten degrees Fahrenheit, and more preferably a temperature of about one hundred and five degrees Fahrenheit, produces desirable results. Any heating or pretreatment of the whole milk 100 prior to separation 203 may depend upon the type of separator being employed, e.g., a centrifugal separator or membrane filtration unit.

After separation, the skim 102 and the cream 104 are preferably processed in parallel before being rejoined in the agitation tank 56, if cream 104 is rejoined. The separated skim 102 is preferably heated 205, such as by flowing through a skim heat exchanger 24, preferably to a temperature of between about 120 to about 150 degrees Fahrenheit, and more preferably from about 135 to about 140 degrees Fahrenheit, thereby creating a heated skim 106. The heated skim 106 is then added to a mixing tank 26 to be combined 213 with a quantity of desired edible oil 108, such as soybean oil, that is usually stored onsite 211. In fluid communication with the mixing tank 26, is a supply 211 of edible oil, which may be, for example, a 4×4×4 portable oil tote having a capacity of approximately 360 gallons. As the heated skim 106 is delivered to the mixing tank 26, oil 108 from the supply 211 is metered into the tank 26. The amount of oil 108 is based upon an oil-to-skim ratio that is predetermined before starting the substantially automated process and is programmed into the PLC through the HMI. The desired oil-to-skim ratio may range from 1:1 to 1:99, but preferably is about 1:19. Although any suitable blending device may work, a preferred mixing tank 26 is a Breddo Likwifier™ available from American Ingredients Company of Kansas City, Mo. While a single tank 26 is shown, a plurality of tanks 26 may be cascaded to accommodate various production capacities. The flow of skim 106 to the mixing tank 26 may be monitored by a flowmeter (not shown), and the mixing tank 26 may be provided with level indicators, which are utilized for high level alarm while filling. If a plurality of mixing tanks 26 is used, the system 10 may automatically fill each of the plurality of tanks 26 in succession, based on a whole milk batch size entered into the HMI and recorded by the PLC. Upon or near the completion of the filling cycle of the mixing tank 26, the skim-and-oil mixture may be blended. The blend time is preferably predetermined and set on the HMI prior to starting the process, but is preferably on the order of about one to about ten minutes, and more preferably about 3 to about 5 minutes. Where a plurality of mixing tanks 26 are used, the blending process may begin while successive tanks 26 are being filled with the skim 106 and oil 108. Alternatively, or additionally, to the skim 106 and oil 108 being mixed in mixing tanks 26, oil 108 may be introduced into the fluid flow conduit of the skim 106, perhaps eliminating the need for a mixing tank 26.

The blended skim-and-oil mixture 110 may be pumped by a pump 30, which may be a positive pump, to a shearing device 32, such as a colloid mill. Other shearing or blending devices could be used, such as a shear pump, a hydroshear device, a high level shear mixer, or even a homogenizer, although the latter may be less desirable based on desired particle size. An example of a high level shear mixer that may be employed is a Quadro Ytron Z Emulsifier, available from Quadro (US) Inc. of Millburn, N.J. The shearing device 32 is used to shear 215 the skim-and-oil mixture 110 to, at least in part, standardize the particle size of the mixture 110 prior to being added to a processing tank 56, thereby forming a particulated skim 112. As used herein, "particle size" refers to the preferred maximum dimension through the geometric center of any particle of a given mixture. For instance, the particle size of a spherical particle would be its diameter. The desired particle size of the mixture 112 prior to being added to the processing tank 56 is about 0.1 micron to about ten microns. The shearing is preferably carried out at a pressure of about fifty to about 2000 pounds per square inch (psi), and more preferably at a pressure of about 850 to about 950 psi, and more preferably at a pressure of about 900 psi. The particulated skim 112 is then added to the processing tank 56, to which cream may be added, which may have been processed substantially in parallel.

Turning now to the preferably parallel processing of the separated cream 104, the cream 104 is preferably heated 207 and then homogenized 209 prior to being added to the processing tank 56 with the skim-and-oil mixture 110. While the heating 207 of the cream 104 is optional, it may be desirable prior to homogenization 209 as it has been found to improve flavor of the resulting product. Cream heating 207 may be provided by causing the separated cream 104 to flow through a cream heat exchanger 42, thereby creating a heated cream 114. A preferred temperature range for the heated cream 114 is about 145 to about 170 degrees Fahrenheit, and more preferably about 165 degrees Fahrenheit. The heated cream 114 may be forced through the cream heat exchanger 42 by a pump 40, which may be a positive pump, to maintain a relatively constant pressure supply to the homogenization 209 step. While a single homogenizer may be used, two or more optional homogenizers may be provided. The direction of heated cream 114 to a desired homogenizer 52 or 54 may be provided by a flowverter panel 44. For instance, a larger 10,000-lb. batch homogenizer 52 and a smaller 700-lb. batch homogenizer 54 may be provided. The speed of the pump 40 is controlled to maintain a relatively constant inlet pressure on the selected homogenizer, which may be measured by a pressure transducer (not shown). If the smaller homogenizer 54 is used, the flowverter 44 is switched to divert the cream 114 to the small homogenizer 54 and by-pass a hold tube 48, cream cooler heat exchanger 50, and larger homogenizer 52. The smaller homogenizer 54 then homogenizes 209 the provided cream 114 at a predetermined pressure. If the larger homogenizer 52 is used, the flowverter 44 is switched to divert the cream 114 through a hold tube 48, which provides a hold time, or travel time, of preferably about twenty-one seconds at a predetermined flow rate, such as about 4.6 gallons per minute. The cream 114 is then preferably cooled through a cream cooler heat exchanger 50, thereby producing cooled cream 116 that may be presented to the larger homogenizer 52. The temperature of the cooled cream is preferably about 120 degrees to about 150 degrees Fahrenheit, and more preferably about 135 degrees to about 140 degrees Fahrenheit. The cooled cream 116 is then provided to the large homogenizer 52 for homogenization 209. Regardless of which homogenizer is used, the homogenization 209 occurs at a predetermined pressure, which is preferably about 2,000 to about 5,000 pounds per square inch, and more preferably at about 250 bar or about 3,600 to about 3,650 pounds per square inch. The resulting homogenized cream 122 includes at least substantially homogeneous particles having preferred sizes from about 0.04 microns to about 1 micron, and more preferably about 0.08 microns to about 0.5 microns. A predetermined amount, including none, of the homogenized cream 122 is then provided to the processing tank 56, therein joining the particulated skim-and-oil mixture 112. While described and shown as being added to the particulated skim-and-oil mixture 112, a predetermined amount of homogenized cream 122 may alternatively be added prior to the standardization process 215 to the blended skim-and-oil mixture 110. If the homogenized cream 122 is added prior to the particle size standardization 215, the shearing is preferably carried out at a lower pressure, preferably about 125 to about 160 psi. A plurality of processing tanks 56 may be provided, if desired to handle the volume of the process.

Regarding the processing tank 56, the tank 56 may be a zoned jacketed tank, which may be provided with level indicators (not shown) and an agitator, such as a batch pasteurization tank. During the filling of the processing tank 56 with the sheared skim-and-oil mixture 112 and the homogenized cream 122, the agitator and various jacket zones are controlled. For instance, when the tank 56 is approximately five percent full, the agitator may begin, rotating at a top speed of preferably about five to about thirty revolutions per minute, and more preferably at a top speed of about twenty-five revolutions per minute. Also when the tank 56 is about five percent full, hot water may be introduced into a bottom zone of the tank jacket. The temperature control for the heating media used in the tank jacket is controlled by way of a cascade proportional, integral, derivative (PID) loop, as is known in the art. When the tank 56 is about twenty percent full, hot water may be introduced into a lower side zone of the tank jacket, and when the tank 56 is about sixty percent full, hot water may be introduced into a top side zone of the tank jacket. While the hot water used in the jacketed tank 56 may be provided by any suitable source, the jacket water source is preferably coupled to the same hot water supply that provides hot water to the various heat exchangers in the system 10. The skim-and-oil mixture 112 and cream 122, having been combined to form a milk-and-oil mixture within the tank 56, is held and agitated at a predetermined rate for a predetermined amount of time at a predetermined temperature, the parameters for which may be entered into the HMI prior to processing by the system 10. The predetermined length of time for holding and agitating the milk-and-oil mixture is preferably about five minutes to about 120 minutes, and more preferably about twenty to about sixty minutes. The predetermined agitation rate is mentioned above, but is generally a relatively mild agitation. The predetermined temperature of the milk-and-oil mixture in the tank 56 is preferably about 120 degrees to about 150 degrees Fahrenheit, and more preferably about 130 degrees to about 140 degrees Fahrenheit, and more preferably about 135 degrees Fahrenheit.

After the milk-and-oil mixture has been held and agitated 217 for the desired time, the mixture 124 may be transferred out of the processing tank 56, preferably at a rate of about twenty-four gallons per minute. The transfer may be aided by a pump 58 and the milk-and-oil mixture 124 is preferably cooled through a milk-and-oil mixture cooler heat exchanger 60, to form a cooled milk-and-oil mixture 126. The temperature of the cooled milk-and-oil mixture 126 may be any desired temperature suitable for the next separation 219, but the temperature is preferably about 105 degrees Fahrenheit. The cooled milk-and-oil mixture 126 is presented to a separator 62 for a milk-and-oil separation 219. The separator 62 performs a separation 219 of a majority of the edible oil from a first reduced cholesterol milk product 130, sending waste oil 128 to a waste oil tank 65, which may be used as a basis for biodiesel fuel, as an ingredient for food products such as mayonnaise, or potentially as food for animals. The first reduced cholesterol milk product 130 may be held 221 in a surge tank 66, if desired for process flow. From the surge tank 66, the first reduced cholesterol milk product 130 may actually be packaged and sold as an end product 237, in and of itself, perhaps as an ingredient for further processing.

Alternatively, further processing may be performed. For instance, the first reduced cholesterol milk product 130 may include some residual oil, which may be addressed in at least a couple of ways. A second milk-and-oil separation 224 may be performed, thereby attempting to separate additional waste oil 223 from a second reduced cholesterol milk product 226, and the second reduced cholesterol milk product 226 may be packaged and sold as an end product 239, in and of itself.

Preferably, however, a second milk separation 225 is performed on the first reduced cholesterol milk product 130. The first reduced cholesterol milk product 130 is provided to an additional separator 70 from the surge tank 66 by a pump 68 at a desired flow rate, such as about twenty-five gallons per minute. While shown in FIG. 3 as utilizing an additional separator 70, the separation 225 may be performed by the same separator 22 that performed the initial whole milk separation 203, rather than requiring the additional separator 70. If this is desirable, the separator 22 is preferably cleaned during the time in which batch processing 217 occurs in the processing tank 56. Regardless of which separator is used, the separation results in a first reduced cholesterol skim 132 and a first reduced cholesterol cream 136. The first reduced cholesterol skim 132 is preferably chilled by a first reduced cholesterol skim heat exchanger 73 to a preferred storage temperature, to provide a cooled first reduced cholesterol skim 134 to be stored in a first reduced cholesterol skim storage tank 74. The first reduced cholesterol skim 132 is cooled to a temperature of preferably about forty-five degrees Fahrenheit or below, to form the cooled first reduced cholesterol skim 134. Alternatively, rather than being chilled and stored after the separation 225, the first reduced cholesterol skim 134 may be processed through another separation 228, resulting in a second reduced cholesterol skim 230 and further waste oil 223. Thereafter, the second reduced cholesterol skim 230 may be chilled and stored in a similar manner as described in connection with the first 132.

The first reduced cholesterol cream 136, although it could be packaged and sold in its present form, is preferably separated again 231. The first reduced cholesterol cream 136 is preferably fed to another separator 78, perhaps by way of a positive pump 77. This separation 231 results in a second reduced cholesterol cream 140 and more waste oil 138 which is fed 223 to the waste oil tank 65. The second reduced cholesterol cream 140 is then preferably cooled to a predetermined temperature by a second reduced cholesterol cream cooler heat exchanger 84 to form a cooled second reduced cholesterol cream 142, which may be fed into a storage tank 86. The predetermined temperature to which the second reduced cholesterol cream 140 is cooled is preferably about forty-five degrees Fahrenheit or below, and more preferably about forty degrees Fahrenheit.

Desired products are then mixed 235 to form a final end product to be shipped 241. In the system 10 depicted in FIG. 3, a cooled first reduced cholesterol skim 134 and a cooled second reduced cholesterol cream 142 are combined in a predetermined ratio to form a reduced cholesterol milk product 144 having desired properties. The predetermined ratio may include zero percent of either of the products to be mixed where, for example, only the skim or only the cream is to be provided as the reduced cholesterol milk product 144. An on-line solids/fat sensor may be used to standardize the reduced cholesterol milk product 144 to a predetermined milk fat percentage, such as two percent. The milk product 144 may then be stored in a storage tank 92, preferably at a predetermined temperature, to await pick-up. A centrifugal pump 94 may be provided to assist in the transfer of the milk product 144 to a delivery vessel 13, which may be a tanker truck. While the mixing step is shown utilizing a first reduced cholesterol skim 134 and a second reduced cholesterol cream 142, it is to be understood that the mixing step 235 may combine any of the reduced cholesterol products, such as the first reduced cholesterol milk product 130, the second reduced cholesterol milk product 226, the first reduced cholesterol skim 132, the second reduced cholesterol skim 230, the first reduced cholesterol cream 136, and/or the second reduced cholesterol cream 140.

The system 10 may also utilize a plurality of balance tanks, such as those 71, 76, and 80 shown in FIG. 3, to ensure generally continuous process flow for processing a desired amount of end product. Additionally, the system 10 may incorporate a clean in place (CIP) system for cleaning the respective tanks and fluid flow conduits.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:
1. A method comprising the steps of:
providing skim and cream;
combining said skim with an edible oil at a predetermined oil-to-skim ratio thereby making a skim-and-oil mixture;
blending said skim-and-oil mixture thereby forming a blended skim-and-oil mixture;

standardizing the particle size of said blended skim-and-oil mixture thereby forming a particulated skim-and-oil mixture;

homogenizing said cream thereby making homogenized cream;

combining a predetermined amount of said homogenized cream with said particulated skim-and-oil mixture thereby making a milk-and-oil mixture;

holding said milk-and-oil mixture at a predetermined hold temperature for a predetermined period of time;

agitating said milk-and-oil mixture during said holding step; and separating a majority of said oil from said milk-and-oil mixture thereby leaving a first reduced cholesterol milk product.

2. A method according to claim 1, said method further comprising the step of separating said first reduced cholesterol milk product into a first reduced cholesterol skim and a first reduced cholesterol cream.

3. A method according to claim 2, said method further comprising the step of combining said first reduced cholesterol skim with said first reduced cholesterol cream at a predetermined skim-cream ratio, thereby making a second reduced cholesterol milk product.

4. A method according to claim 2, said method further comprising the step of separating substantially all of any remaining oil from said first reduced cholesterol cream, thereby leaving a second reduced cholesterol cream.

5. A method according to claim 4, said method further comprising the step of combining said first reduced cholesterol skim with said second reduced cholesterol cream at a predetermined skim-cream ratio, thereby making a second reduced cholesterol milk product.

6. A method according to claim 4, said method further comprising the step of separating substantially all of any remaining oil from said first reduced cholesterol skim, thereby leaving a second reduced cholesterol skim.

7. A method according to claim 6, said method further comprising the step of combining said second reduced cholesterol skim with said second reduced cholesterol cream at a predetermined skim-cream ratio, thereby making a second reduced cholesterol milk product.

8. A method according to claim 2, said method further comprising the step of separating substantially all of any remaining oil from said first reduced cholesterol skim, thereby leaving a second reduced cholesterol skim.

9. A method according to claim 8, said method further comprising the step of combining said second reduced cholesterol skim with said first reduced cholesterol cream at a predetermined skim-cream ratio, thereby making a second reduced cholesterol milk product.

10. A method according to claim 1, said method further comprising the steps of:
receiving whole milk; and
separating said whole milk to provide said skim and said cream.

11. A method according to claim 1, said standardizing step comprising the step of shearing the blended skim-and-oil mixture.

12. A method according to claim 11, said shearing step is carried out by a shear pump.

13. A method according to claim 11, said shearing step is carried out by a colloid mill.

14. A method according to claim 1, said method further comprising the step of heating said skim prior to blending said skim with said edible oil.

15. A method according to claim 1, said method further comprising the step of heating said cream prior to homogenizing said cream.

16. A method according to claim 1, said edible oil comprising soybean oil.

17. A method according to claim 1, said oil-to-skim ratio being about 1 part oil to about 19 parts skim.

18. A method according to claim 1, said particulated skim-and-oil mixture having a particle size in the range of about 0.1 microns to about 10 microns.

19. A method according to claim 1, said homogenized cream having a particle size of about 0.04 microns to about 1 micron.

20. A method according to claim 1, said method being performed substantially automatically by a system after initial programming by an operator.

21. A method according to claim 1, further comprising the step of:
maintaining the milk-and-oil mixture at a hold temperature of about 130 degrees Fahrenheit to about 145 degrees Fahrenheit during said holding step.

22. A method according to claim 21, said hold temperature being about 135 degrees Fahrenheit.

23. A method comprising the steps of:
providing an initial milk product;
combining said initial milk product with an edible oil at a predetermined oil-to-milk ratio thereby making a milk-and-oil mixture;
blending said milk-and-oil mixture thereby forming a blended milk-and-oil mixture;
providing a cream;
homogenizing said cream thereby making a homogenized cream;
combining a predetermined amount of said homogenized cream with said blended milk-and-oil mixture;
standardizing the particle size of said blended milk-and-oil mixture thereby forming a particulated milk-and-oil mixture;
holding said particulated milk-and-oil mixture at a predetermined hold temperature for a predetermined period of time;
agitating said particulated milk-and-oil mixture during said holding step, thereby forming a modified milk-and-oil mixture; and
separating a majority of said oil from said modified milk-and-oil mixture thereby leaving a first reduced cholesterol milk product.

24. A method according to claim 23, the initial milk product comprising less than 0.05 percent fat.

25. A method according to claim 23, further comprising the step of:
separating whole milk to obtain said initial milk product and said cream.

* * * * *